June 23, 1964
W. LIMBERGER
3,138,424
APPARATUS FOR SHAPING WORKPIECES
Filed Feb. 2, 1959
7 Sheets-Sheet 1
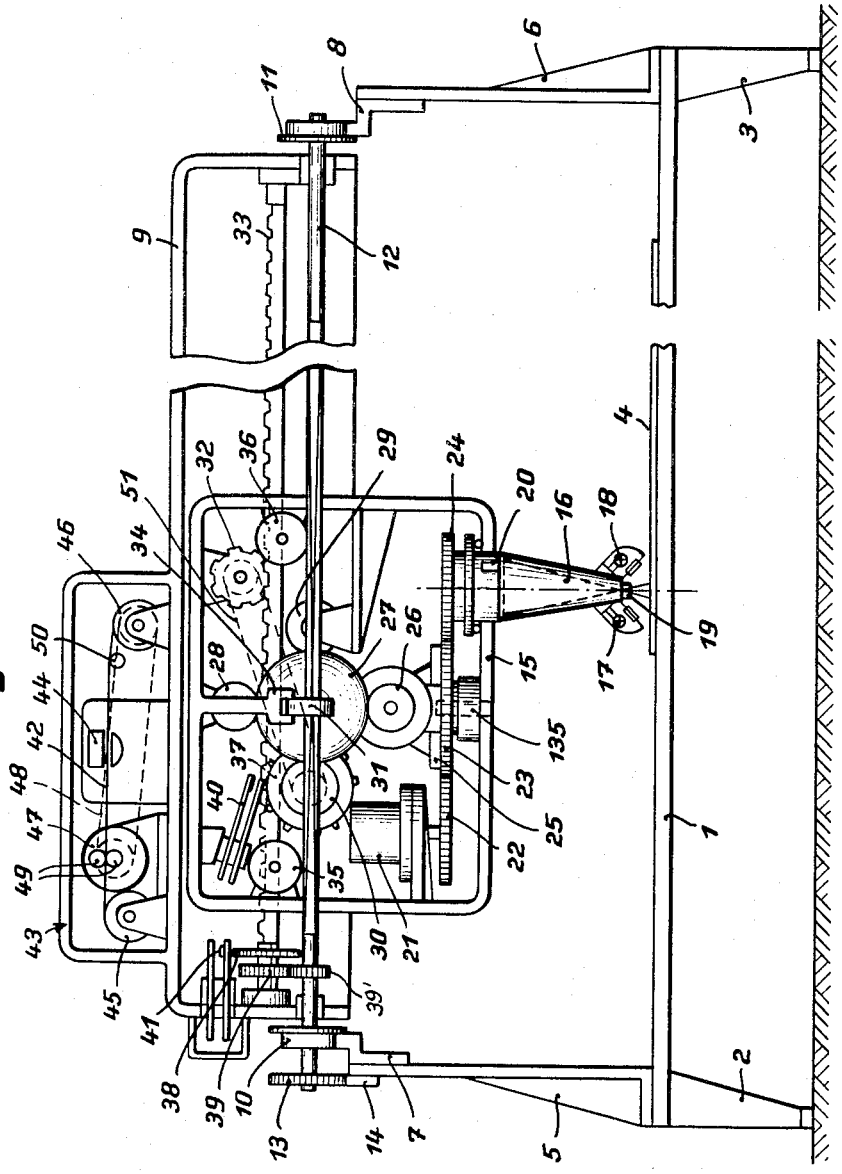
INVENTOR:
Walter Limberger
BY
*Karl F. Ross*
AGENT

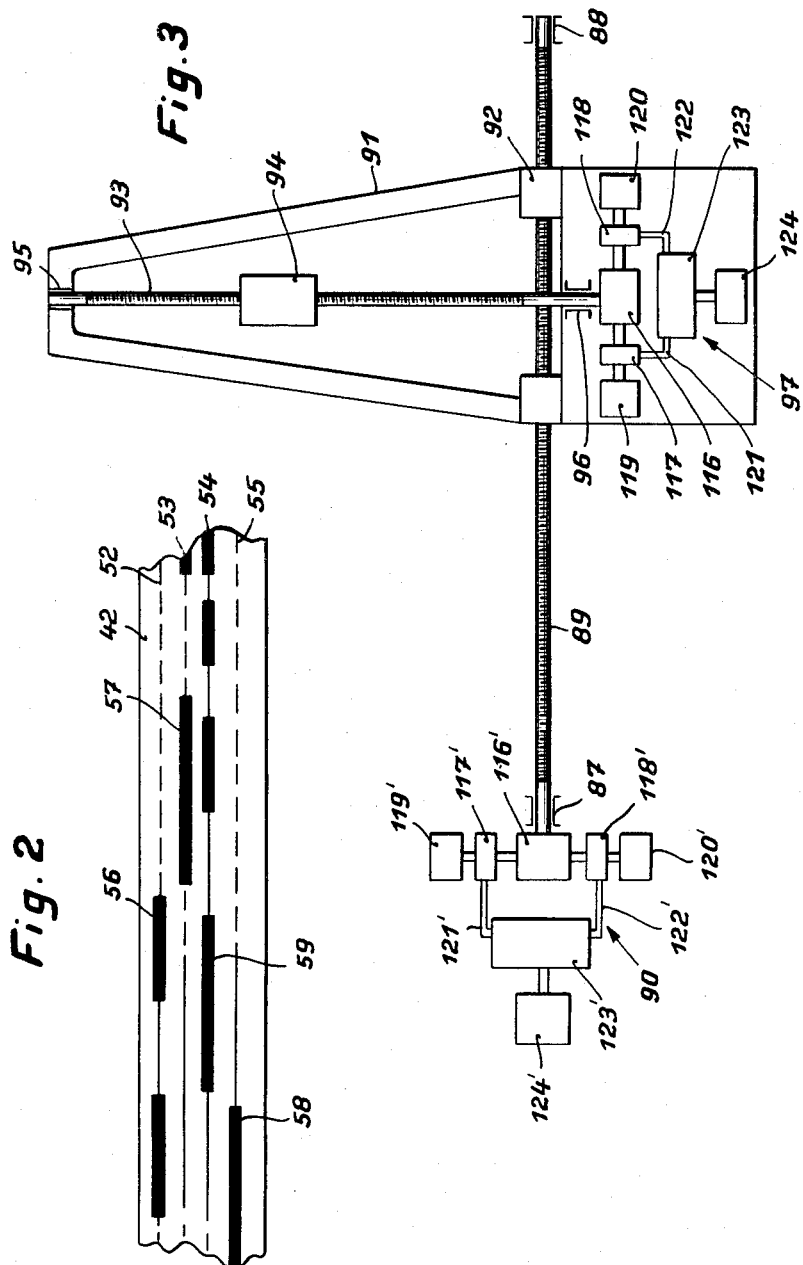

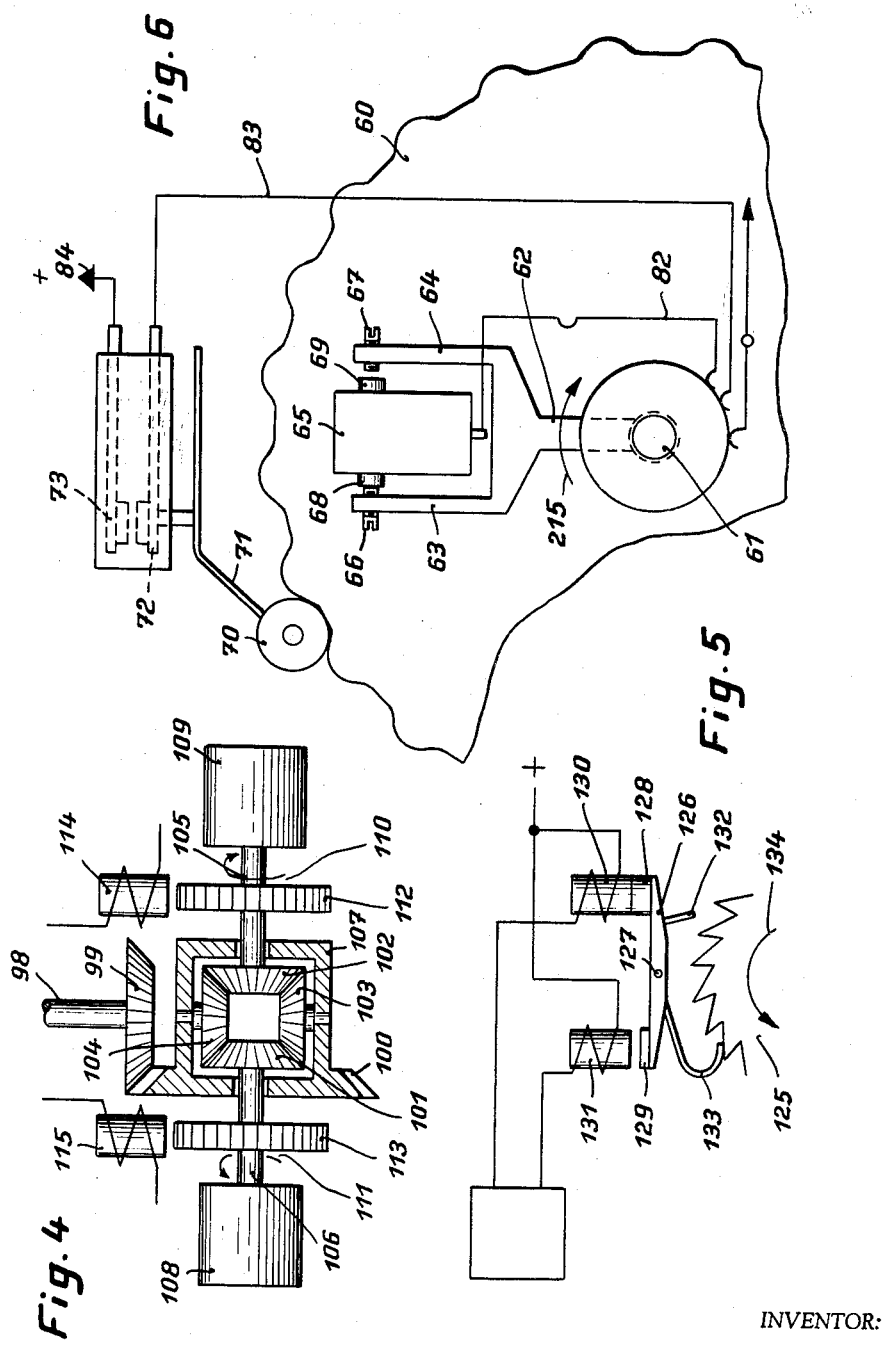

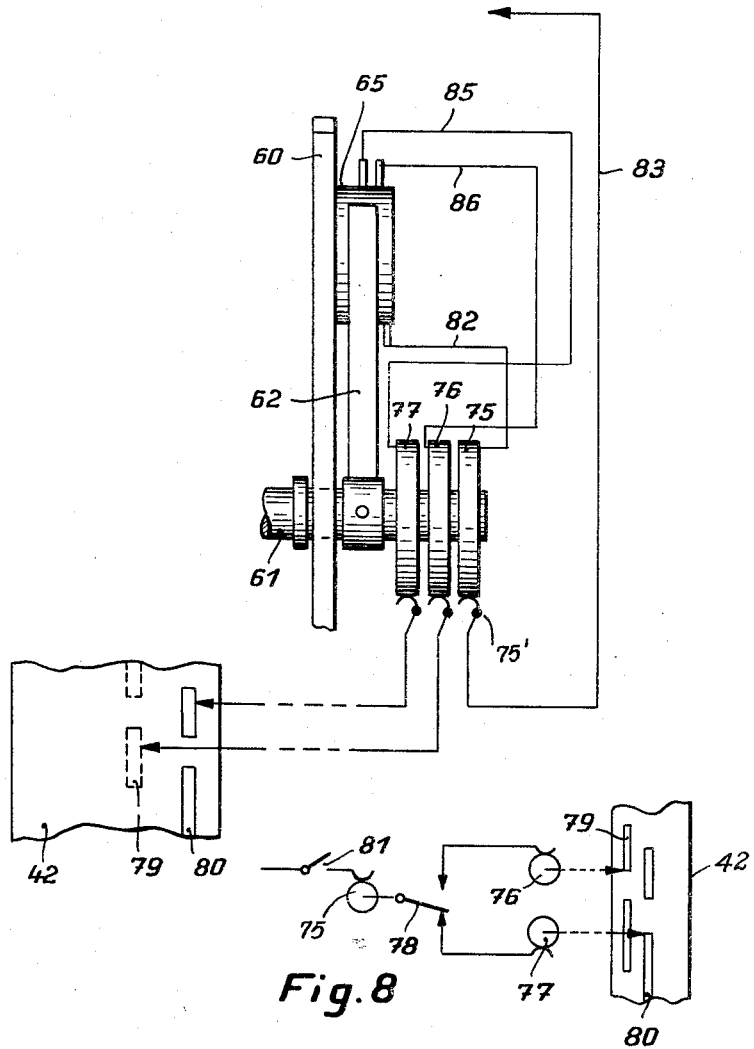

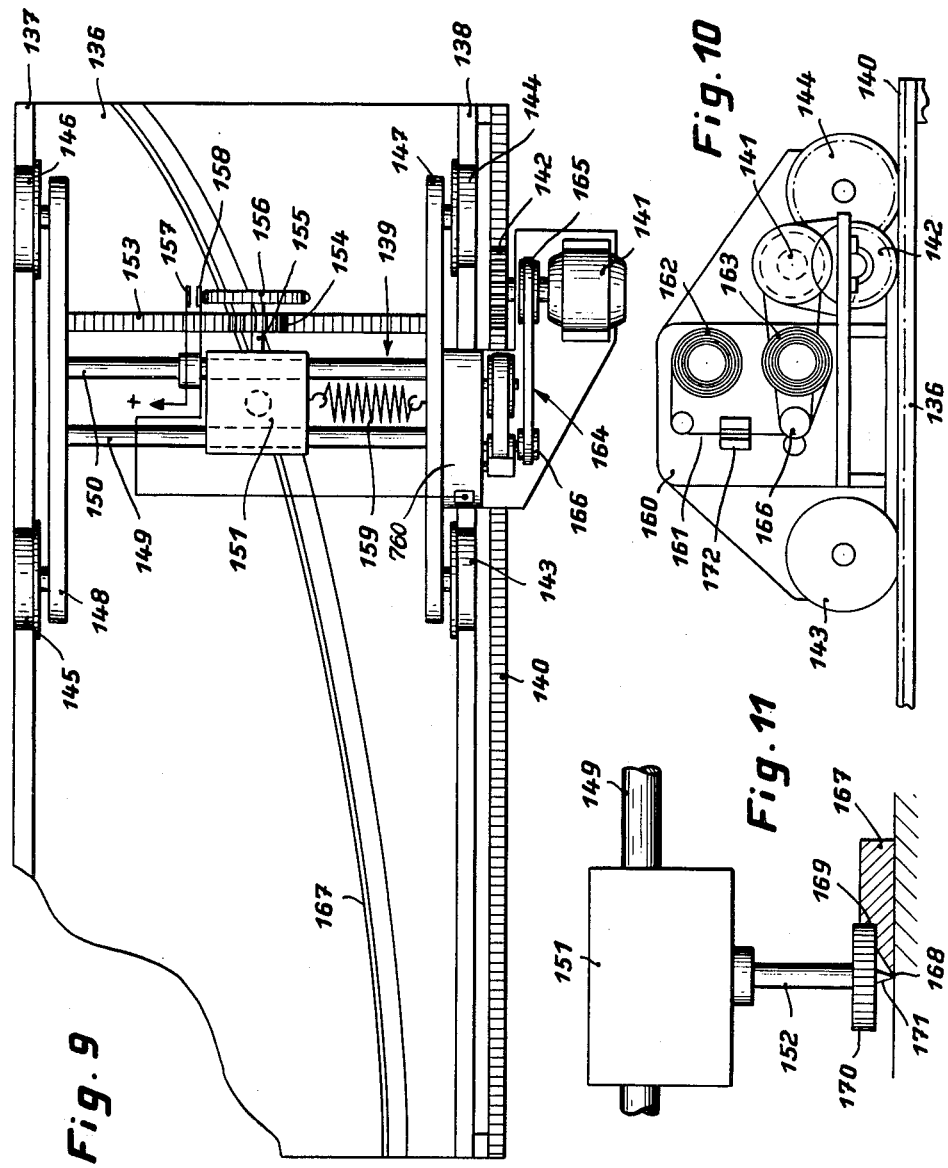

June 23, 1964   W. LIMBERGER   3,138,424
APPARATUS FOR SHAPING WORKPIECES
Filed Feb. 2, 1959   7 Sheets-Sheet 6

INVENTOR:
Walter Limberger
BY
AGENT

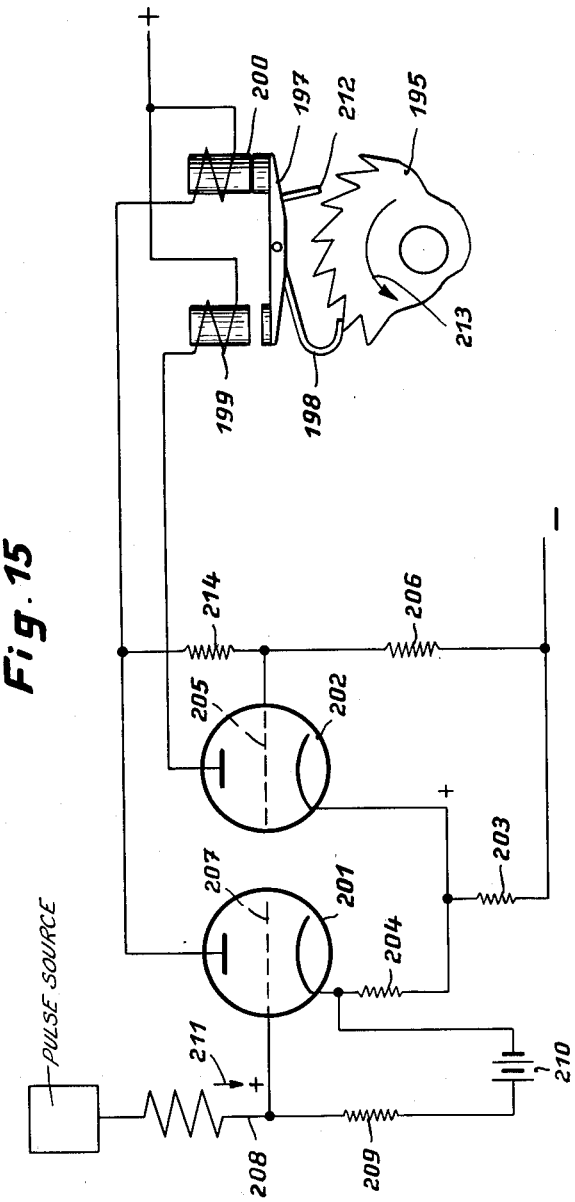

United States Patent Office 3,138,424
Patented June 23, 1964

3,138,424
APPARATUS FOR SHAPING WORKPIECES
Walter Limberger, Hamburg, Germany, assignor to
Lumoprint Zindler Kg., Hamburg, Germany
Filed Feb. 2, 1959, Ser. No. 790,731
10 Claims. (Cl. 346—33)

The present invention relates to a system for controlling the relative displacement between a tool and a workpiece, e.g. as used in shipbuilding for the cutting of large plates to predetermined contours.

It is known to control the relative displacement between a workpiece and a tool by mounting the latter on a carriage and actuating a drive mechanism for the carriage in response to pulses emitted by a scanner which follows the outline of a pattern. Two sets of pulses may be used for displacing the carriage in two dimensions, or else it is possible to displace the tool at constant speed in one dimension and to control its movement only in the other dimension with the aid of scanner-emitted pulses. The scanner, in turn, may be of the optical type or may follow the contours of the pattern by mechanical engagement therewith. It is also known to store the scanner pulses on a suitable recording medium, such as a magnetic tape, in order to make the operating speed of the tool independent of that of the scanner.

Prior systems of this general character suffer from the disadvantage of complexity, requiring the use of relatively cumbersome equipment which is not only expensive to manufacture and to maintain but also tedious to adjust and slow in its operation. The invention has for its object the provision of a simplified control system of this character.

In accordance with the invention there is provided a variable-speed pulse generator which is driven by a transmission member coupled with the scanner support, this generator producing a train of pulses whose cadence, or repetition frequency, varies proportionally with the rate of displacement of the scanner support in a particular dimension. These pulses, after storage on a magnetic tape or similar recording medium, control a follower such as a tool carrier so that its rate of advance in a corresponding dimension is proportional to that of the scanner support. More particularly, the movement of the follower in the aforesaid dimension is brought about by a controller which includes drive means tending to advance the follower, in combination with an escapement mechanism for holding the follower stationary against the force of its drive means while momentarily releasing it in response to any recorded pulse in such manner as to permit an advance of the follower by an invariable increment upon the occurrence of any such pulse. The number of increments per unit of time, and thus the speed of the controller, depends accordingly upon the recurrence frequency of the pulses.

If the controlled movement of the follower is to occur in either of two directions, it will be convenient to duplicate the escapement mechanism for the purpose of effecting an advance in one sense or the other in response to pulses carried on different tracks of the medium. The two escapement drives are, in this case, advantageously coupled to a power shaft for the follower by way of a common differential gear.

The variable-speed generator may be coupled directly to a source of driving power which serves to displace the scanner in the particular dimension considered. This will be the case especially where the scanner is of the optical type and has a photocell controlling the operation of an associated motor which in turn moves the scanner support. In other instances, as where this support is entrained by the scanner as the latter places the controls of a pattern in physical engagement with it, the drive of the pulse generator may be derived from the motion of the support via a rack-and-pinion mechanism or the like.

If the motion of the scanner support and, therefore, of the generator is to be reversible, the latter, in accordance with a further feature of the invention, may be provided with a lost-motion device comprising a pair of rotary elements laggingly entraining each other in such manner that, upon rotation in one direction or the other, different contacts are closed to cause the emission of information indicative of the direction of rotation. While such information may take the form of a special pulse train, it is preferred to provide it in the form of a switching signal which causes the speed-indicating pulses to be recorded on either one or another track of the tape.

Further advantages and features of the invention appear from the following description of an embodiment which is illustrated in the accompanying drawing. In the drawing:

FIG. 1 is a diagrammatic side view of the device carrying the scanner, with the housing walls removed;

FIG. 2 is a plan view of a recording element with four tracks;

FIG. 3 shows a top view of the advancing elements for the tool;

FIG. 4 shows an enlarged portion of the system of FIG. 3 partially in section;

FIG. 5 is a partial side view of an escapement mechanism, which is used in FIG. 4;

FIG. 6 is a partial view of a particular construction of a cam wheel for producing the pulses or signals;

FIG. 7 is a side view of the assembly of FIG. 6;

FIG. 8 is an illustration of the main circuit of the device according to FIGS. 6 and 7;

FIG. 9 is a top view of a modified device for registering information on a recording element;

FIG. 10 is a partial side view of the device according to FIG. 9;

FIG. 11 shows a construction of the modified scanner and the control curve in section;

FIG. 15 shows a switch unit for controlling the advance of the tool in the last-mentioned machine.

Figure 12:
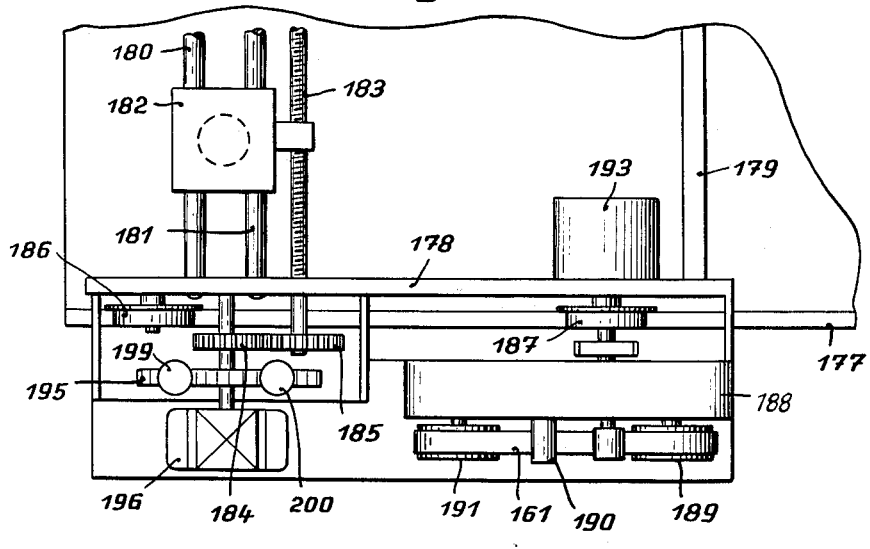
FIG. 12 is a partial top view of the modified device carrying the tool.

The device illustrated in FIG. 1 has a table 1 which is supported upon feet 2 and 3. Upon this table is laid a pattern or a drawing 4 or the optical image of a drawing which gives the contours of the workpiece to be shaped. Above this table guide rails 7, 8 are supported upon brackets 5, 6 and run parallel to two sides of the table 1. A carriage 9 is movably arranged upon these guide rails 7, 8. This carriage is provided with wheels 10, 11 which run on the rails 7, 8. The shaft 12 for the wheels 10, 11 is extended beyond the wheel 10 and carries a gear wheel 13 which engages a gear rack 14 running parallel to the rail 7.

In FIG. 1, only one shaft 12 with two wheels 10, 11 is visible. The carriage 9 is provided with a parallel shaft which carries two further wheels. It is not necessary for this further shaft to be provided with a gear wheel which engages a gear rack.

A spider or cage 15 is longitudinally movably mounted on the shaft 12 and the other shaft (not shown) running parallel thereto. The direction of movement of the spider 15 is therefore perpendicular to the direction of movement of the carriage 9, which is determined by the rails 7, 8. Rollers, such as those designated 35, 36, are provided for guiding the spider 15 and can run on the shaft 12 or on rails which are parallel thereto.

The scanner 16 is rotatably arranged on the underside of the spider 15. This scanner includes an optical reading device and carries light sources 17, 18 for illuminating the drawing 4 and, at its lower end, an objective 19 by which the reflected light beam is focused. The arrangement is such that this light beam is directed into a photocell 20 positioned eccentrically in the scanner and displaceable in the plane of motion. This displacement is effected by contacts (not shown) arranged in the scanner, which switch on a motor 21 in the particular direction of rotation required. This motor 21 drives the gear wheel 22 which engages a gear ring 23, the latter meshing with a gear wheel 24 on the upper end of the scanner 16.

The gear ring 23 is located at the edge of a plate, rotatably mounted in the spider 15 on a rotary bearing 135, which carries a driving motor 25 for a driving wheel 26. This driving wheel is in contact with a sphere 27 of a friction-wheel drive. Sphere 27 is supported for example by wheels 28, 29, 30, 31, of which the wheels 30 and 31 serve also for the advance of the scanner 16.

The wheel 31, which serves as a driving element for the friction-wheel drive, is axially slidable on the shaft 12. This shaft is profiled in the region of the range of movement of the wheel 31, as by being of square cross-section, so that despite its longitudinal mobility a non-rotatable coupling between the wheel 31 and the shaft 12 is ensured. The wheel 31 is non-shiftably mounted in the spider 15, however, by being guided in a fork 34 arranged on the spider 15. Upon a rotation of the wheel 31 in one direction, the shaft 12 is rotated and hence the gear wheel 13 is driven whereby, following by virtue of the engagement of the gear wheel 13 with the gear rack 14, a movement of the carriage 9 on the rails 7, 8 is effected.

The wheel 30, which is displaced with respect to the wheel 31 by 90°, drives a pinion 32 in the spider 15 by means of a chain 51, the pinion 32 engaging a gear rack 33 extending in the carriage 9 parallel to the shaft 12. By a rotation of the wheel 30, an advance of the spider 15 is effected perpendicular to the direction of movement determined by the rails 7, 8.

From the above it is seen that the sphere 27 is continuously driven by the motor 25, the direction of movement of the sphere being altered by swinging the driving wheel 26 about the axis of bearing 135 in accordance with the setting of the scanner 16. Since the wheels 30 and 31 are mutually offset by 90°, the mutually perpendicular components of the movement to be imparted to the scanner support 15 are determined by the rotation of the sphere 27 and are transmitted to the drive shafts (shaft 12 and shaft of gear 32) controlling the respective directions of scanner movement.

In dependence upon the movements of the scanner in the mutually perpendicular directions, pulse generators are actuated. These pulse generators consist for example of cam disks 37 and 38. The cam disk 37 is shown connected with the wheel 30, whereas the cam disk 38 is shown coupled with the shaft 12 by way of pinions 39, 39'. The transmission ratio of sprockets 39, 39' is determined by the desired scale ratio between the drawing and the workpiece.

Each cam disk 37 and 38 is associated with a respective pair of contacts 40, 41, which include each a fixed contact and a movable contact. The movable contact is actuated by the associated cam disk 37, 38 and engages the fixed contact when a hump of the cam disk passes under it. Thus, the rotation of the cam disks 37 and 38 produces pulses whose duration and spacing are proportional to the rate of rotation of the cam disks.

These pulses are supplied to a recording element 42, which is enclosed in a separate housing 43 on the carriage 9, by means of a magnet head 44. In the embodiment illustrated, a supply reel 45 and a wind-up reel 46 are provided, the latter being driven over a belt 48 by a motor 47. It may be mentioned that, instead of the belt drives 48, 51, other transmission means such as pinion-wheel drives or the like can be used. In a preferred construction, supporting rollers, as shown for example at 50, are provided adjacent the recording head 44. Advantageously, a pair of rollers 49 are provided, of which one is carried on the shaft of motor 47 while the other serves as a counterpressure roller for driving the recording element.

The circuit for marking the recording element 42, e.g. a magnetic tape, is so arranged that the pulses originating from the pairs of contacts 40, 41 are registered on separate tracks on the recording element. Each cam disk, as described hereinafter with reference to FIG. 6, may be associated with a separate device by which further pulses or signals are produced and are supplied to the recording element, in order to indicate the instantaneous direction of movement. This supplemental marking is effected on a separate track so that each orthogonal component of displacement corresponds to two tracks, there being altogether four tracks provided on the recording element. Preferably, the direction-indicating pulses or signals are used for the selective actuation of a single recording head associated with a particular orthogonal component of motion.

A section of the recording element is shown in FIG. 2. The tracks included in the recording element 42 are shown at 52, 53, 54 and 55. Each pair of tracks, for example the tracks 52 and 53 on the one hand and the tracks 54 and 55 on the other hand, relate to one component of movement of the machine. In the example illustrated in FIG. 2, the circuit is so arranged that the track 52 controls one orthogonal component of movement in one direction and the track 53 controls the same component in the opposite direction. Correspondingly, the track 54 serves for controlling the other component of movement in one direction and the track 55 for controlling the latter component of movement in the opposite direction. It is apparent that, among each pair of tracks, only one is utilized at a time. Reversal of the direction for one component of movement occurs, for example, between the last pulse 56 on the track 52 and the first pulse 57 on the track 53. For the other component of movement, a reversal of the direction occurs between the pulses 58 on the track 55 and the pulses 59 on the track 54. From FIG. 2 it is seen that the movement on the track 54 after the reversal begins at first slowly, as indicated by the length of the pulse and their spacings, and then progressively accelerates. The illustration of the tracks is merely diagrammatic for explaining the process which takes place.

FIGS. 6, 7 and 8 show in detail the means by which the directing pulses are produced. In these figures, a pulse-generating cam disk representative of either disk 37, 38 (FIG. 1) is indicated at 60. This cam disk is guided upon its shaft 61 but is freely rotatable thereon. Together with the cam disk 60 there is located on the shaft 61 in a non-rotatable manner a fork 62 whose arms 63, 64 straddle a switch 65 rigidly mounted on the cam disk 60. It can be seen, particularly from FIG. 6, that between the arms 63, 64 and the switch 65 there is provided a clearance which is adjustable by stop screws 66, 67. In one revolution of the shaft 61, the cam disk 60 is carried round so that one of the screws 66, 67 comes into contact with a button 68 or 69 projecting from switch 65. In FIG. 6, rotation of the shaft occurs in the direction of the arrow 215. The cam disk 60 is carried along by pressure of the stop screw 66 upon button 68 and a switch mechanism is thereby actuated. Actuation of the switch effects a rotation of the recording head so that either one of the tracks 52, 53 or of the tracks 54, 55 is utilized to register the pulses.

FIG. 6 also shows a cam follower 70 which is yieldingly supported by a spring 71 so that it can be raised and lowered on rotation of the cam disk 60. The spring 71 is connected with the movable contact 72 which is brought into engagement with the fixed contact 73 whenever the cam follower 70 is raised, so that the pulse is thus produced. The elements 72, 73 are representative of either contact pair 40, 41 in FIG. 1.

It can be seen that the current supply to the contact pair 72, 73 is effected over a lead in dependence upon the actuation of the switch 65, here shown as being made operative at its button 68.

Further details of the pulse distributor of FIG. 6 are shown in FIGS. 7 and 8. FIG. 8 schematically illustrates three slip rings 75, 76, 77 which are arranged on the shaft 61 in the manner depicted in FIG. 7. The switchover contacts 78 leading in FIG. 8 to the slip rings 76 and 77 are constructed, in the embodiment according to FIG. 6, by the contacts (not shown) respectively actuated by the push buttons 68, 69 in dependence upon the direction of rotation. Each slip ring 76 and 77 is connected with a respective recording head and associated with a track 79 or 80 (which together represent either track pair 52, 53 or 54, 55 of FIG. 2) on the recording element 42. By the switch 65, via its buttons 68 and 69, only one of the slip rings 76, 77 is connected, in dependence upon the direction of rotation, to the pair of contacts 72, 73, which are represented in FIG. 8 by a switch 81, so that only one track 79 or 80 is marked at a time. For reading, the direction of the drive of the tool in the corresponding movement component is controlled in dependence upon which track of the recording element is marked.

It is to be noted that, in FIGS. 6 and 7, the switch 65 rotates with its buttons 68, 69 on the shaft 61 by reason of its entrainment by fork 62. One pole of this switch is shown connected by a lead 82 with the slip ring 75 whose brush 75′ is connected via the lead 83 to one contact of the pair of contacts 72 and 73, for example, the contact 72. The other contact 73 of that pair is connected by the lead 84 to one pole of the source of potential.

The two switchover contacts controlled by the buttons 68 and 69 in the switch 65 are connected by leads 85 and 86 with the slip rings 77 and 76. These leads can pass for example within the cam disk 60 or along its surface and are not separately illustrated in FIG. 6. From the circuit according to FIG. 7 it can be seen that the contacts 72 and 73 are alternately connected via the switch 65, in dependence upon the direction of rotation, with either one of the associated slip rings 76, 77, so that only one track is marked.

The device for moving the tool is illustrated in FIG. 3 merely in its parts essential for the invention, its bed or base having been omitted. In the bed (not shown), a spindle 89 is rotatably mounted in bearings 87 and 88. This spindle is driven by means of a unit 90 which is described later. The bed further supports a frame 91 whose movement is controlled by a nut 92 secured to it in engagement with the spindle 89. Additional guiding elements, not shown, may include a wheel and rails on the frame. This frame 91 carries a further spindle 93 upon which the support 94 for the tool is mounted for movement along the spindle in dependence upon its rotation. This spindle 93 is journaled at 95 and 96 in the frame 91 and is driven by a unit 97 which corresponds to the unit 90 and is explained with reference to FIG. 4.

FIG. 4 illustrates a driving mechanism which, by reason of its positioning, corresponds to the unit 97. The driving spindle, illustrated in FIG. 4 at 98, thus represents the spindle 93 of FIG. 3. This driving spindle carries on its end a bevel gear 99 which engages the crown gear 100 of a differential housing 107. This differential housing encloses two planet gears 101 and 102, which engage sun gears 103 and 104. The shafts 105 and 106 of the planet gears 102 and 101 are guided out through the housing 107 and are connected with torque producers 108 and 109. These torque producers (for example electric motors) load the shafts 105 and 106 with counteracting rotary moments, as by tending to rotate the shaft 105 in the direction of the arrow 110 and the shaft 106 in the direction of the arrow 111. Further, the shafts 105 and 106 carry parts of an escapement mechanism, here shown as ratchet wheels 112 and 113. These ratchet wheels are associated with pawls, not shown in FIG. 4, which are actuatable in dependence upon the pulses on the recording element 42 via magnets 114 and 115 in a manner described later. In FIG. 3, in the units 90 and 97, the enclosure for the differential is illustrated at 116, 116′, the escapement mechanism at 117, 117′ and 118, 118′ and the torque producers at 119, 119′ and 120, 120′. The escapement mechanism is connected by leads 121, 121′ and 122, 122′ with a reading device 123, 123′ for the recording element. This reading device is no particular part of the invention and is not described in detail. The drive of the reading device is effected by motors 124, 124′ which run synchronously and either are in step with the driving motor 47 or have a speed differing from that of motor 47 in accordance with the desired scale ratio.

The escapement mechanism is shown in detail in FIG. 5. It can be seen that each such mechanism composes a ratchet wheel 125, representative of those illustrated in FIG. 4 at 113 and 112. The associated pawl consists of a double-armed lever 126 pivotable about an axis 127 and carrying magnet armatures 128, 129 or its extremities. These magnet armatures lie in front of magnets 131 and 130 which are alternately excited and de-energized by way of a diagrammatically illustrated circuit arrangement. Pivoting of the lever 126 about its axis 127 is thus effected. Upon such movement a dog 132 on the right-hand end of lever 126 and a hook 133 on its left-hand end alternatively engage or disengage the ratchet wheel. The circuit is so energized that the magnet 131 is excited when the escapement mechanismn is locked. In this position, the hook 133 is lifted off the ratchet wheel 125 whereas the dog 132 prevents rotations of the ratchet wheel in the direction of the arrow 134. This is the direction in which the shaft carrying the ratchet wheel 125 is urged by the associated torque producer and is driven on release so that the corresponding planet gear is then rotated. If, by a pulse from the recording element, reversal of the magnets 130 and 131 occurs, the locking lever 126 is brought into the position shown, that is the dog 132 is raised from the ratchet wheel and the hook 133 is lowered so that the ratchet wheel 125 can move forward by one ratchet tooth until the hook 133 prevents further movement. On a further reversal, the state of excitation of the magnets again changes so that the dog 132 engages the ratchet wheel whereas the hook 133 pivots out of engagement. No further rotation of the ratchet wheel can then occur.

The spindle 98 of FIG. 4 follows the movement of the unlocked ratchet wheel 112 or 113. If both escapement mechanisms 112, 114 and 113, 115 are locked, the spindle 98 remains at rest. If the shaft 106 is rotated in the direction of the arrow 111 by release of the ratchet wheel 113, the planet gear 101 rotates whereby the sun gears 103 and 104 are likewise driven. Since, however, the planet gear 102 is locked, the rotation of gear 101 is transmitted to the differential housing 107 and hence to the crown gear 100 so that the shaft 98 is rotated by the bevel gear 99. If alternatively the shaft 105 is released, rotation of the spindle 98 occurs in the same way, but in the opposite direction.

It can be seen that the spindle 89 and 93 are rotated in either direction in dependence upon the pulses from the recording element, so that the tool is correspondingly shifted upon the support 94 and follows the curve which the scanner 16 (FIG. 1) senses. The ratchet wheels are so dimensioned that the stepwise movement gives a correspondingly smooth operative curve.

In FIG. 3 the reading devices for each spindle 89 and 93 are shown separately at 123, 123′. This requires that the recording elements be split into two parts which, on the machine carrying the tool are separately guided past the reading devices associated with each direction of advance. The invention includes the possibility of using an undivided recording element, in which case merely one reading device 123 is provided and the pulses taken up by the reading heads are supplied by electrical connections to the escapement mechanisms 117 and 118.

The device described enables a relatively complex command to be carried out with simple, compactly arranged elements in a reliable manner; at the same time the overall construction of the machine is considerably simplified thereby.

In the embodiment illustrated in FIGS. 9 and 10, the device for marking the recording elements composes a rectangular table 136 provided, along its major sides, with guide rails 137 and 138 for the longitudinal movement of a carriage generally indicated at 139. Alongside the rail 138, for example, a gear rack 140 is located which is engaged by a pinion 142 arranged on the carriage 139 and driven by the electric motor 141, in order to move the carriage in the longitudinal direction of the table. Instead of the gear rack 140 and the pinion 142, other means can be used, for example a nut and a spindle, of which one part is driven and the other is held rigid.

The carriage 139 is provided with pairs of wheels 143, 144; 145, 146 which run on the rails. The wheels 143 and 144 or 145 and 146 are mounted on axles which are supported in frames 147 and 148. Between the frames 147, 148 is located a guide track, consisting of two rails 149, 150, for the support 151 of a mechanical scanner 152 (FIG. 11). The scanner 152 is rigidly secured in the support 151.

A gear rack 153 extends next to the rails 149 and 150 and parallel thereto. A pinion 154 engages this rack and is non-rotatably keyed to a shaft 155 freely rotatable in the support 151. The shaft 155 also carries the cam disk 156 which thus rotates synchonously with the pinion 154 if the scanner support 151 is shifted along the track 149, 150.

A contact device consisting of two contacts 157, 158 is also provided on the support 151, contact 157 being fixedly or adjustably arranged which contact 158 co-acting with the humps of the cam disk 156, is movable so that on rotation of a hump under the contact 158 the contact pair 157, 158 is closed.

A force storer 159, inserted between one of the frames 147, 148 and the support 151, urges the carrier in a predetermined direction of advance. In the arrangement shown, the force storer 159 is provided as a tension spring between the frame 147 and the carrier 151.

The circuit of contacts 157, 158 is extended to a device 160, arranged on the frame 147, in which the recording elements is guided.

A magnetic tape 161 serves as the recording element in the embodiment now described. This constructional form is preferred since recordings on magnetic tape are erasable so that the recording element can be used for numerous different workpiece shapes, a recording being erasable after completion of any such workpiece. The magnetic tape is arranged on a supply reel 162 and is drawn off with a corresponding velocity as the carriage 139 moves along the rails 137, 138, being then wound upon a storage reel 163. The advance of the tape is derived from the movement of the pinion 142 or some other element associated therewith, for example, by means of a belt drive 164. In the embodiment here illustrated, in which the driving motor 141 is arranged on the carriage 139, the belt-drive pulley 165 is disposed on the shaft of the motor 141 whereas the driven pulley 166 is supported on the device 160 carrying the magnetic tape.

A curved template 167 is arranged on the table 136 between the rails, its curvature corresponding exactly to the shape of the edge to be cut or machined. The profile of the template 167 is to be seen more clearly in FIG. 11. It is to be noted that the template profile includes a control edge 168 and a guide step 169. Along the guide step runs a roller 170 which may be freely rotatable on the scanner 152. By the provision of this roller 170, the frictional forces in sensing the template 167 are substantially decreased. A feeler tip 171 extending axially from the scanner 152 contacts the edge 168 of the template 167 and enables a control precise sensing at any time.

The device illustrated in FIGS. 9 to 11 operates as follows: On being set in motion, the carriage 139 is located for example at the right-hand end of the table 136. The rails 137, 138 extend beyond the system of wheels 143 to 146 over the table carrying the curved template 167, so that the scanner 152 stands at the beginning of the curved template or at a location on this template which corresponds to the limit of a plate to be machined. After the electric motor 137 has been switched on, the carriage 139 is moved by rotation of the pinion 142 along the rails 137 and 138. The scanner 152 is held by the force storer 159 in continual contact with the curved template 167, so that the support 151 is displaced along the guide rails 149, 150 (in FIG. 9 for example toward sthe bottom). The pinion 154, which engages the gear rack 153, rotates and correspondingly turns the cam disk 156. The contacts 157 and 158 are closed and opened at a rate corresponding to the speed of rotation of the cam disk. The pulses thus given, with contact 157 connected to a source of potential, are supplied to the magnet head 172.

Figure 14:
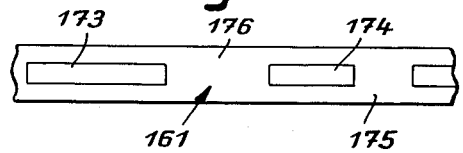
FIG. 14 shows a part of the recording element associated with the machine of FIGS. 9–13.

Upon the movement of the carriage 139 along the rails 137, 138, the magnetic tape 161 is driven by way of the belt 164 so that the pulses produced by the contacts 157, 158 are continuously recorded on this tape. The duration and the spacing of these pulses depends upon the rotational velocity of the cam disk 156. It will be apparent for example from FIG. 14, that the magnetic tape 161 contains markings 173, 174 of different lengths, separated by different longitudinal intervals 175, 176. It is to be noted that, in dependence upon the curvature of the guide template 167, the number of markings 173, 174 per unit length of the magnetic tape 161 will vary. Upon a large increase in the slope of the curved template 167, the markings 174 and their spacings 175 are shorter than in a region of a lesser increase where the markings 173, by reason of the slower passage of a cam dwell under the contact 158, are longer and the intervening spaces 176 are similarly lengthened. The recording on the magnetic tape 161 hence faithfully represents the curvature of the template 167.

Figure 13:
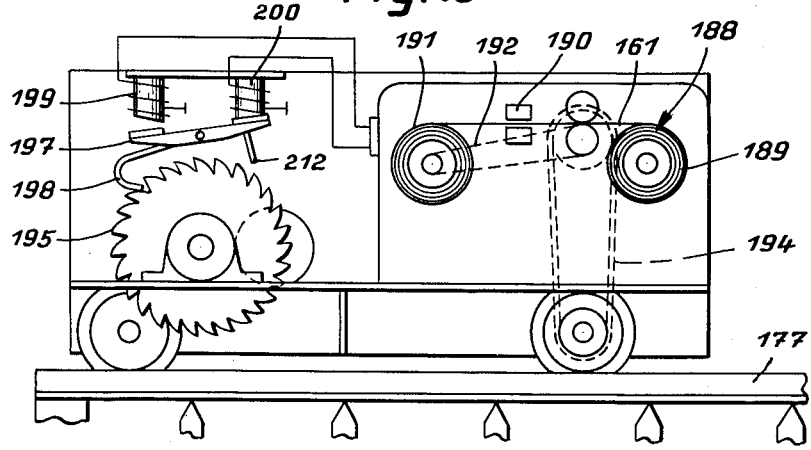
FIG. 13 is a partial side view of the device according to FIG. 12.

According to the manner in which the magnetic tape 161 is thus marked, the tool carrying device illustrated in FIGS. 12 and 13 is set in operation.

The basic construction of this device corresponds to the device shown in FIGS. 9 and 10, differing from it merely in its dimensions.

The device shown in FIGS. 12 and 13 is provided with a frame which includes a rail along each longitudinal side, only one such rail 177 being illustrated. Along these rails runs a carriage which consists of side struts 178 and a transverse strut 179. The side struts 178 are further connected together by a guide track, consisting of two rails 180, 181, for the tool carrier 182. A threaded spindle 183, arranged parallel to the rails 180, 181, is driven by a mechanism which includes a pair of gears 184, 185.

The axles of the wheels 186, 187, which run on the rails 177, are also secured to the side struts 178. Furthermore, the rails 178 carry a device 188 corresponding to the device 160 into which the marked magnetic tape 161 is inserted. The magnetic tape is again drawn from a reel 189 and, after passing through the reading head 190, is wound up on the other reel 191. The advance of the magnetic tape is effected via reel 191 by a belt drive 192 which is powered by the shaft of the driving motor 193. The electric motor 193 drives the wheel 187 by way of a belt drive 194; it could also drive a pinion (not shown) which engages a gear rack (likewise not shown) as described in connection with motor 141 (FIG. 9). By the use of a pinion drive for moving the carriage 178, 179, slipping between the rails 177 and the wheels 186, 187 is avoided.

It can be seen particularly from FIG. 13 that the spindle 183 is driven, via gears 184, 185, by an escapement including a ratchet wheel 195. A torque is continuously exerted on the ratchet wheel, for example by the electric motor 196. A rotation of the ratchet wheel corresponding to this torque is normally prevented by a locking pawl 197, similar to pawl 126 (FIG. 5) which engages the teeth of the ratchet wheel. The locking pawl 197 consists again of a two-armed lever which carries on one side a hook 198 and on the other side a pin 212 which engage the teeth facing them in the instantaneous position and, upon a swing of the locking pawl into its alternative position, allow a rotation of the ratchet wheel by one tooth division.

The locking pawl 197 is controlled by two magnets 199, 200 which are alternately excited by the markings 173, 174 on the magnetic tape 161.

The electric circuit of the magnets 199, 200 is shown in FIG. 15. It comprises a trigger circuit consisting of two triodes 201, 202, respectively connected to the magnets 199, 200. The cathodes of the tubes are connected via a series resistance 203 to the negative terminal of a source of potential. A further series resistance 204 is included in the cathode lead of the tube 201. The anode of the tube 201 is connected via the coil of magnet 200 to the positive terminal of the source of potential and also through a series resistance 214 to the control grid 205 of the tube 202. Between the grid and the negative terminal of the potential source, a further series resistance 206 is provided. The anode of the tube 202 is connected via the coil of magnet 199 to the positive terminal of the potential source. The control grid 207 of the tube 201 is connected to a conductor 208 over which the pulses are supplied in accordance with the markings on the magnetic tape 161. The conductor 208 is connected via a series resistance 209 and a grid-biasing potential source 210 to the cathode of the tube 201.

The circuit is so arranged that the tube 202 normally draws current. On the occurrence of a positive pulse in the conductor 208 from the diagrammatically illustrated pulse source, the negative potential on the grid 207 is decreased so that current begins to flow through the tube 201 and thereby effects stepwise operation of the trigger circuit. As indicated by the arrow 211 in FIG. 15, the instant is shown at which the operation escapement mechanism has been initiated by the application of a positive pulse to the grid 207. The magnet 200 has thus been excited so that the right-hand extremity of locking pawl 197 is attracted. Because of this movement, the pin 212 is raised from the ratchet wheel 195. At the same time, the hook 198 is lowered so that it lies in the path of movement of the next tooth of the ratchet wheel which moves toward it. In the construction illustrated in FIG. 15, the ratchet wheel 195 moves in the direction of the arrow 213. It will be seen that, by the double engagement with the pin 212 on the one hand and with the hook 198 on the other hand, advance can occur merely by one tooth of the ratchet wheel. Upon the dissipation of the positive pulse, the trigger circuit operates to render the tube 202 conductive so that the magnet 199 is excited and the winding of the magnet 200 is de-energized. The hook 198 is then raised from the ratchet wheel and the pin 212 is urged into its locking position on this wheel. The inclination of the flanks of the ratchet teeth is such, with reference to the pivotal movement of the hook 198 and the pin 212, that the engagement of the parts 198 and 212 is effected substantially without friction.

It will be apparent that the ratchet wheel 195 is advanced by one step in response to any marking 173, 174 appearing on the magnetic tape 195. It will be remembered that the number or the density of markings per unit length of the magnetic tape 161, i.e. their frequency, depends upon the slope of the curved template. Consequently, the carrier 182 for the tool is shifted in accordance with the curvature of the template 167; a desired scale reduction between this template 167 and the workpiece may be realized by a corresponding dimensioning of the ratchet wheel 195 or by a suitable transmission ratio between the gears 184, 185 provided between the ratchet wheel 195 and the spindle 183 for driving the carrier 182. Since the magnetic tape 161 is driven from the motor 193, advance of the magnetic tape occurs in dependence upon the velocity of movement of the carriage 139 or 178, 179 so that an exact scale-proportional copy of the curvature represented by the template 167 is ensured. Furthermore, according to the change of scale, a corresponding step-down ratio is to be provided between the movement of the carriage 178, 179 on the rails 177 and the running velocity of the magnetic tape 161, the latter ratio differing from the speed ratio between the carriage 139 and the magnetic tape 161 in the device illustrated in FIGS. 9 and 10.

It may be mentioned that the workpiece, for example a steel plate, which is to be cut corresponding to the curvature of the template 167 is located beneath the carriage 178, 179 or beneath the carrier 182 supporting the tool.

What I claim is:

1. In a system for controlling the displacement of a movable follower in response to information stored on a recording medium in accordance with the movement of a movable scanner, in combination, a scanning support movable in at least one dimension at a variable rate depending upon the configuration of a pattern traced by the scanner, a transmission member coupled with said support for movement at a rate proportional to the rate of displacement of the support in said one dimension, a variable-speed pulse generator driven by said member, said generator producing a train of pulses of a cadence varying proportionally with said rate of displacement, and recording means controlled by the output of said generator for marking said medium with said pulses.

2. The combination according to claim 1 wherein said transmission member comprises part of a scanner-responsive driving mechanism for said support.

3. The combination according to claim 1 wherein the scanner is guided by an external force, said transmission member comprising a pinion, said support being provided with a stationary carrying frame including rack means meshing with said pinion and extending in said one dimension.

4. The combination according to claim 1 wherein said generator comprises a rotatable cam and contacts periodically closable by said cam upon rotation of the latter.

5. The combination according to claim 1 wherein said generator comprises a reversible rotary first element, first contact means periodically closable by said first element upon rotation of the latter, a reversible rotary second element having lost-motion contact with said first element, second contact means jointly controlled by said first and second elements for closure upon rotation of said elements in a predetermined direction only, and circuit means including said first and second contact means for recording on said medium information indicative of the direction of rotation of said elements.

6. The combination according to claim 5 wherein said second element comprises a fork having two prongs straddling said first element, said second contact means being carried on said first element for operation by one of said prongs.

7. The combination according to claim 1 wherein said generator comprises a reversible rotary first element, first contact means periodically closable by said first element upon rotation of the latter, a reversible rotary second element having lost-motion contact with said first element, second and third contact means each jointly controlled by said first and second elements for closure upon rotation of said elements in a respective direction only, and circuit means extending from said second and third contact means by way of said first contact means to said recording means for registering said pulses on different tracks of said medium in response to closure of said second and third contact means, respectively.

8. The combination according to claim 7 wherein said first element comprises a cam disk provided with equi-spaced peripheral humps, said first contact means being positioned for actuation by said humps.

9. The combination according to claim 8 wherein said first element further comprises an axial projection on said cam disk, said disk being provided with a shaft, said second element comprising a fork swingable about said shaft and provided with two prongs straddling said projection, said second and third contact means comprising a pair of buttons respectively extending from said projection toward said prongs.

10. A system for controlling the displacement of a movable follower in response to information stored on a recording medium in accordance with the movement of a movable scanner, comprising a scanning support reversibly movable in two dimensions at a variable rate depending upon the configuration of a pattern traced by the scanner, drive means for displacing said support along a path determined by said pattern with a composite motion having components in both said dimensions, a first and a second variable-speed pulse generator, first and second transmission means coupled with said drive means for operating said first and second pulse generators and speeds proportional to the respective rates of displacement of said support in said two dimensions, recording means adapted to register pulses from said first and second pulse generators on a first and a second pair of tracks, respectively, and first and second switch-over means respectively coupled with said first and second transmission means for selectively directing said pulses to either track of the associated pair in accordance with the direction of displacement of said support in the respective dimension.

References Cited in the file of this patent
UNITED STATES PATENTS

| | | |
|---|---|---|
| 2,338,305 | Simmon | Jan. 4, 1944 |
| 2,537,770 | Livington et al. | Jan. 9, 1951 |
| 2,723,845 | Przybylski et al. | Nov. 15, 1955 |
| 2,755,160 | Holmes | July 17, 1956 |
| 2,833,941 | Rosenberg et al. | May 6, 1958 |
| 2,882,476 | Wetzel | Apr. 14, 1959 |
| 2,943,906 | Thomas | July 5, 1960 |
| 2,954,265 | Devaud et al. | Sept. 27, 1960 |
| 3,001,411 | Wittenborg | Sept. 26, 1961 |

FOREIGN PATENTS

| | | |
|---|---|---|
| 1,114,501 | France | Apr. 13, 1956 |

OTHER REFERENCES

Giddings & Lewis Numericord Bulletin NR-1, 1955.